United States Patent [19]

Mullen-Schultz

[11] Patent Number: 6,032,182

[45] Date of Patent: *Feb. 29, 2000

[54] METHOD, APPARATUS AND COMPUTER PROGRAM PRODUCT FOR USER SELECTED REFRESHING OF INTERNET WEB PAGES

[75] Inventor: Gary Lee Mullen-Schultz, Rochester, Minn.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/890,734

[22] Filed: Jul. 11, 1997

[51] Int. Cl.[7] ................................................. G06F 17/30
[52] U.S. Cl. .................... 709/223; 709/219; 709/206; 709/203
[58] Field of Search ......................... 707/10; 395/200.49, 395/200.33, 200.53; 345/335; 709/203, 206, 219, 223

[56] References Cited

U.S. PATENT DOCUMENTS

| 5,727,156 | 3/1998 | Herr-Hoyman et al. | 709/219 |
| 5,752,042 | 5/1998 | Cole et al. | 709/219 |
| 5,768,511 | 6/1998 | Galvin et al. | 709/203 |
| 5,778,367 | 7/1998 | Wesinger, Jr. et al. | 709/203 |
| 5,813,007 | 9/1998 | Nielsen | 709/206 |
| 5,821,927 | 10/1998 | Gong | 345/335 |

*Primary Examiner*—Zarni Maung
*Assistant Examiner*—Philip B. Tran
*Attorney, Agent, or Firm*—Joan Pennington

[57] ABSTRACT

A method, apparatus and computer program product are provided for user selected refreshing of internet web pages. A user selected refreshing optional setting is stored together with at least one selected internet web page. A request for viewing an internet web page is received. Then checking for the user selected refreshing optional setting for the requested internet web page is performed. Responsive to identifying the user selected refreshing optional setting for the requested internet web page, the requested internet web page is selectively refreshed utilizing the user selected refreshing optional setting. The user selected refreshing optional setting is stored together with the user's favorites and bookmarks of internet web pages. Global browser default values are used when a user selected refreshing optional setting is not identified for a particular requested internet web page.

18 Claims, 6 Drawing Sheets

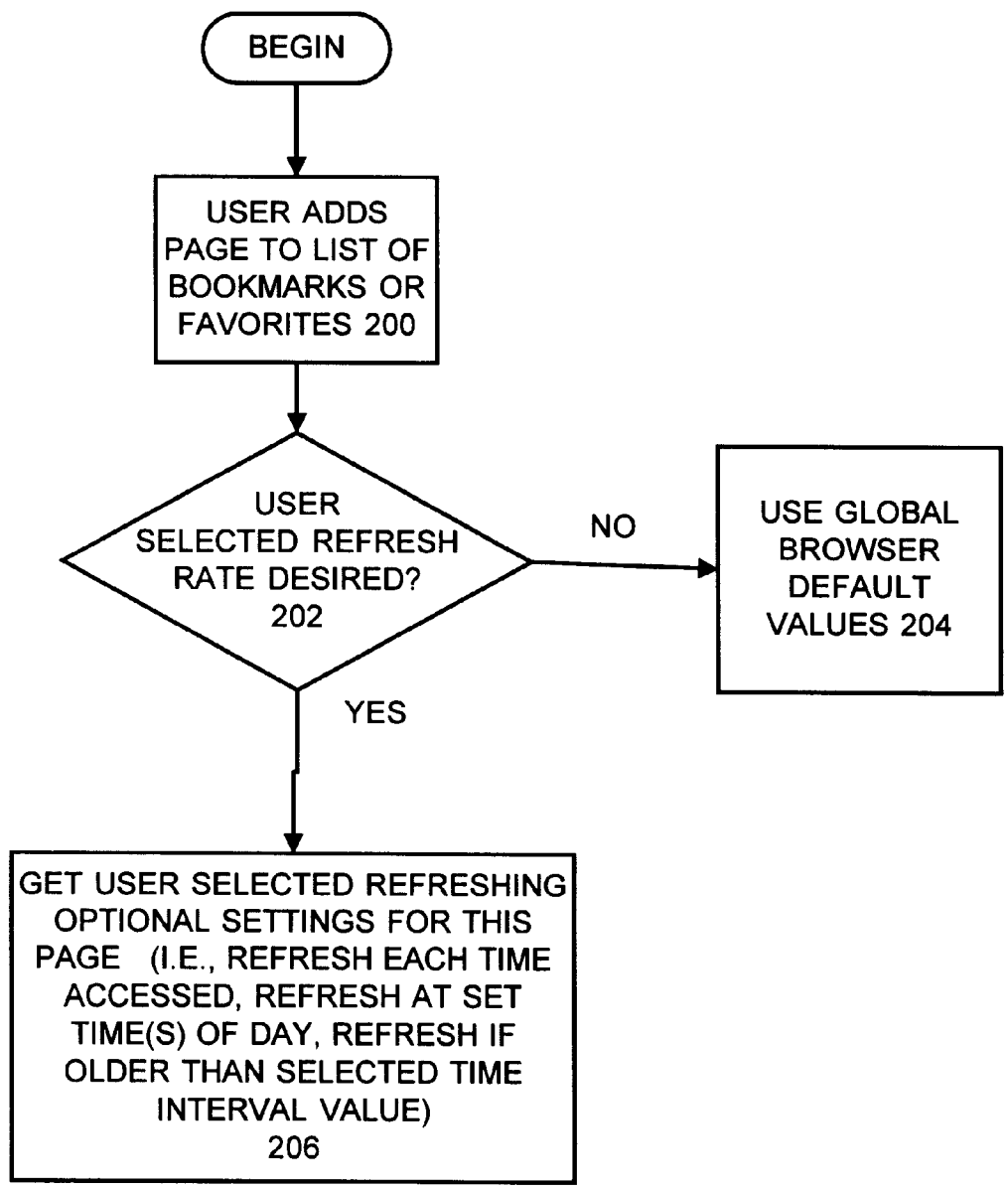

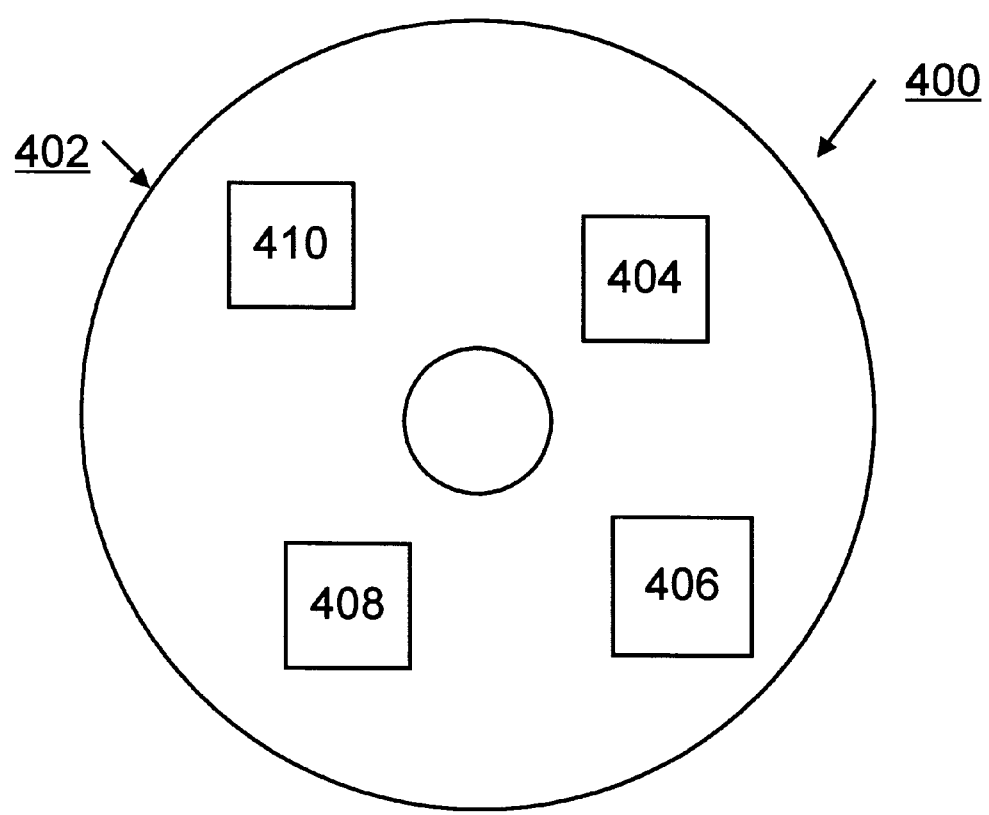

METHOD, APPARATUS AND COMPUTER PROGRAM PRODUCT FOR USER SELECTED REFRESHING OF INTERNET WEB PAGES

FIELD OF THE INVENTION

The present invention relates generally to the data processing field, and more particularly, relates to a method, apparatus and computer program product for user selected refreshing of internet web pages.

DESCRIPTION OF THE RELATED ART

The internet or World Wide Web, although filled with valuable information, is often difficult or cumbersome and time consuming to use for reviewing internet web pages using current browsing technology. Users often spend many minutes either waiting for static screens to needlessly refresh, or manually refreshing dynamic screens.

Known commercially available web browser programs, such as, Netscape Navigator Version 3.01 and Microsoft Internet Explorer 3.0, attempt to solve this problem in a way that is not satisfactory. These browser programs allow the user to specify, on a global browser basis, how often web pages should be refreshed. The choices include always or every time the page is accessed, once per session, or never.

Unfortunately, these three choices on a global browser basis, do not fit well into the way most people use the internet. Some pages should be refreshed every time they are accessed, for example stock quote pages. Other internet web pages are best refreshed on, for example, an hourly basis, such as for a news page. Yet other internet web pages usually change on a daily, weekly, or monthly basis, and so on. Also, this problem is made worse by the fact that the same user has different needs depending on the speed of the link; at work, where the connection is fast, he may want pages refreshed more often than at home, where the speed of the link may be much slower.

Most users keep a list, called either bookmarks or favorites, of the pages they often view. Individual users know from experience how often they want these pages updated. A need exists for browser technology that allow users to put this knowledge to work. A need exists to provide flexible and efficient user selected refreshing of internet web pages.

SUMMARY OF THE INVENTION

A principal object of the present invention is to provide a method, apparatus and computer program product for user selected refreshing of internet web pages. Other important objects of the present invention are to provide such user selected refreshing method, apparatus and computer program product that efficiently and effectively facilitates user control to selectively refresh particular internet web pages to be reviewed; to provide such user selected refreshing method, apparatus and computer program product substantially without negative effect; and provide such user selected refreshing method, apparatus and computer program product that overcome many of the disadvantages of prior art arrangements.

In brief, a method, apparatus and computer program product are provided for user selected refreshing of internet web pages. A user selected refreshing optional setting is stored together with at least one selected internet web page. A request for viewing an internet web page is received. Then checking for the user selected refreshing optional setting for the requested internet web page is performed. Responsive to identifying the user selected refreshing optional setting for the requested internet web page, the requested internet web page is selectively refreshed utilizing the user selected refreshing optional setting.

In accordance with features of the invention, the user selected refreshing optional setting is stored together with the user's favorites and bookmarks of internet web pages. Global browser default values are used when a user selected refreshing optional setting is not identified for a particular requested internet web page.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2, 3A, 3B together provide a flow chart illustrating sequential browser steps for user selected refreshing of internet web pages of the preferred embodiment; and FIG. 4 is a block diagram illustrating a computer program product in accordance with the preferred embodiment.

DETAILED DESCRIPTION OF THE PREFERRED EMBODIMENTS

Figure 1A:
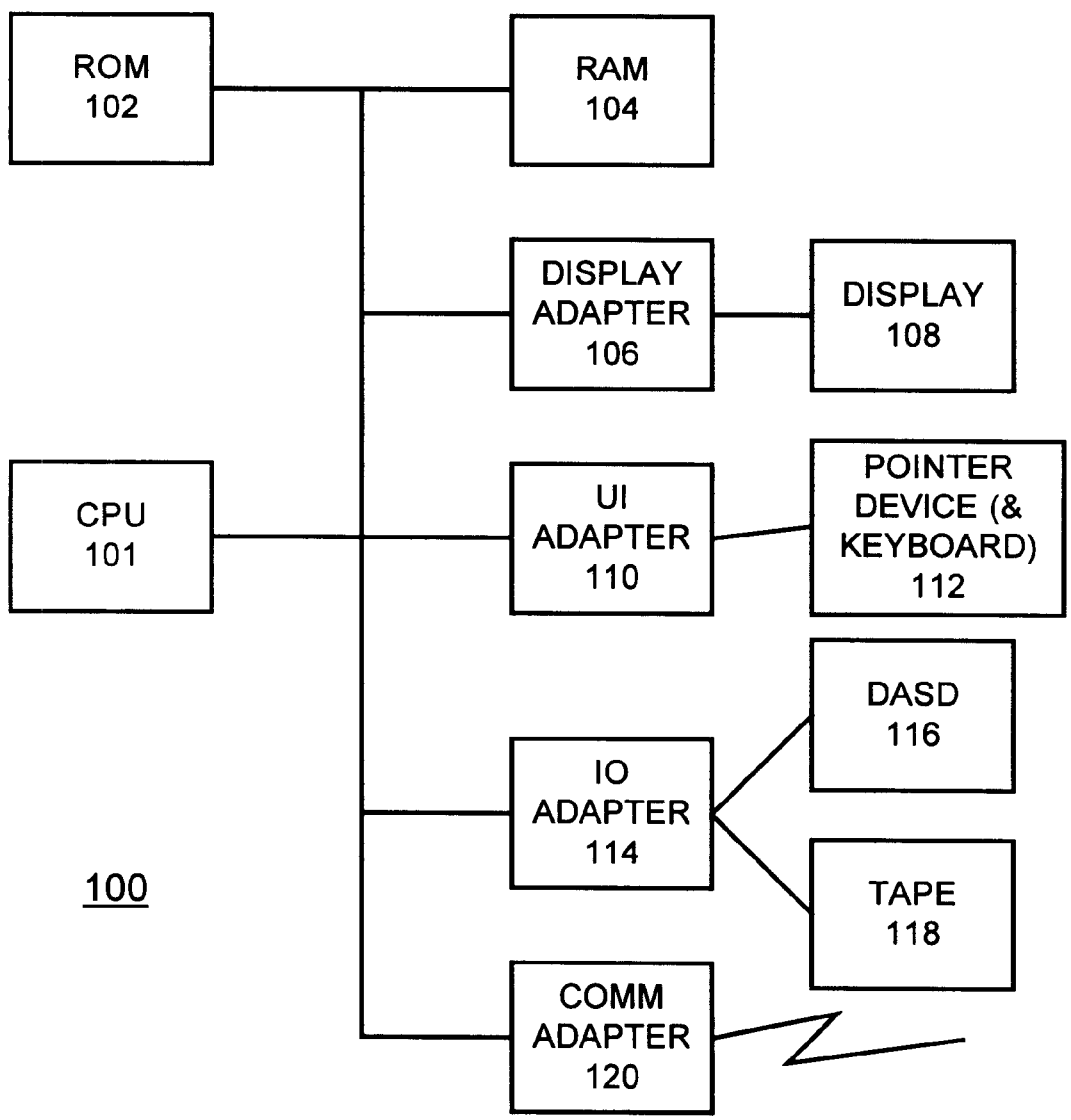
FIGS. 1A and 1B are block diagram representations illustrating a computer system and operating system for implementing a method for user selected refreshing of internet web pages in accordance with the invention.
Figure 1B:
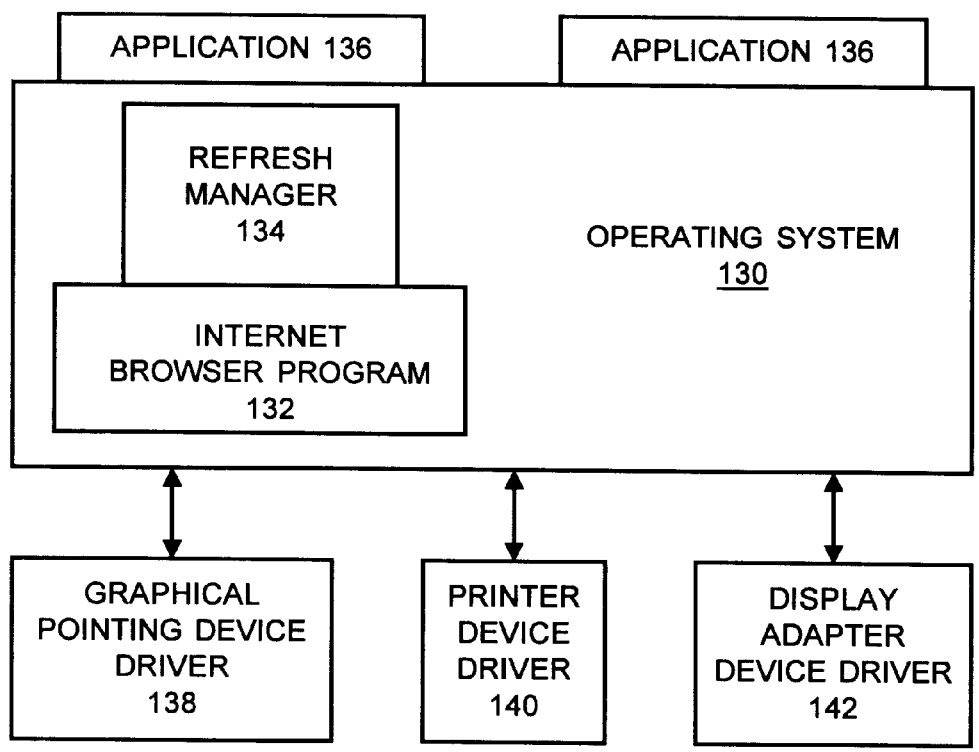

Having reference now to the drawings, in FIGS. 1A and 1B, there is shown a computer or data processing system of the preferred embodiment generally designated by the reference character 100. As shown in FIG. 1A, computer system 100 includes a central processor unit (CPU) 101, a read only memory 102, a random access memory 104, a display adapter 106 coupled to a display 108. CPU 101 is connected to a user interface (UI) adapter 110 connected to a pointer device and keyboard 112. CPU 101 is connected to an input/output (IO) adapter 114 connected to a direct access storage device (DASD) 116 and a tape unit 118. CPU 101 is connected to a communications adapter 120 providing a communications function.

As shown in FIG. 1B, computer system 100 includes an operating system 130, an internet browser program 132 and a refresh manager 134 of the preferred embodiment. Multiple applications 136 and multiple device drivers including a graphical pointing device driver 138, a printer device driver 140, and a display adapter device driver 142 are supported by the operating system 130.

Various commercially available processors could be used for computer system 100, for example, an IBM personal computer or similar workstation can be used. Central processor unit 101 is suitably programmed to execute the flowchart of FIGS. 2, 3A and 3B of the preferred embodiment.

In accordance with features of the preferred embodiment, refresh manager 134 allows users to configure a refresh rate on a user selected granular level for individual user selected internet web pages. This is accomplished with refresh manager 134 by adding user selected refreshing configuration information to the bookmarks and favorites data. The refresh configuration can be made very granular, for example, on a last touch basis to refresh a page if older than a set time interval, such as six hours, and/or on a time of day basis, such as at 6:00 AM and at noon. Refresh manager 134 gives the user great flexibility in configuring the browser program 132 to access web pages in the fastest and most convenient manner possible.

Referring to FIG. 2, there are shown exemplary sequential steps for adding configuration information to the bookmarks and favorites data for user selected internet web pages. For example, as indicated at a block 200, a user adds a new internet web page to the user's list of bookmarks and favorites, a dialog is presented allowing the user to fine-tune the refresh rate for that particular page as indicated at a decision block 202. If the user does nothing, the global browser default values are used as indicated at a block 204. Otherwise, user selected refreshing information is received as indicated at a block 206. For example, as indicated at block 206, the user can configure the particular added page, to be refreshed each time accessed or an always update optional setting, at set times of day, if older than a selected time interval since it was last refreshed, or a never update optional setting. For example, a user can select to refresh a stock quotes page every time it is accessed and to refresh a news page at particular times, such as first thing in the morning and at lunchtime. The user may know that a particular page changes on an hourly basis, and can override the global default value for this particular page to update if older than a most recent time of day optional setting.

Figure 3A:
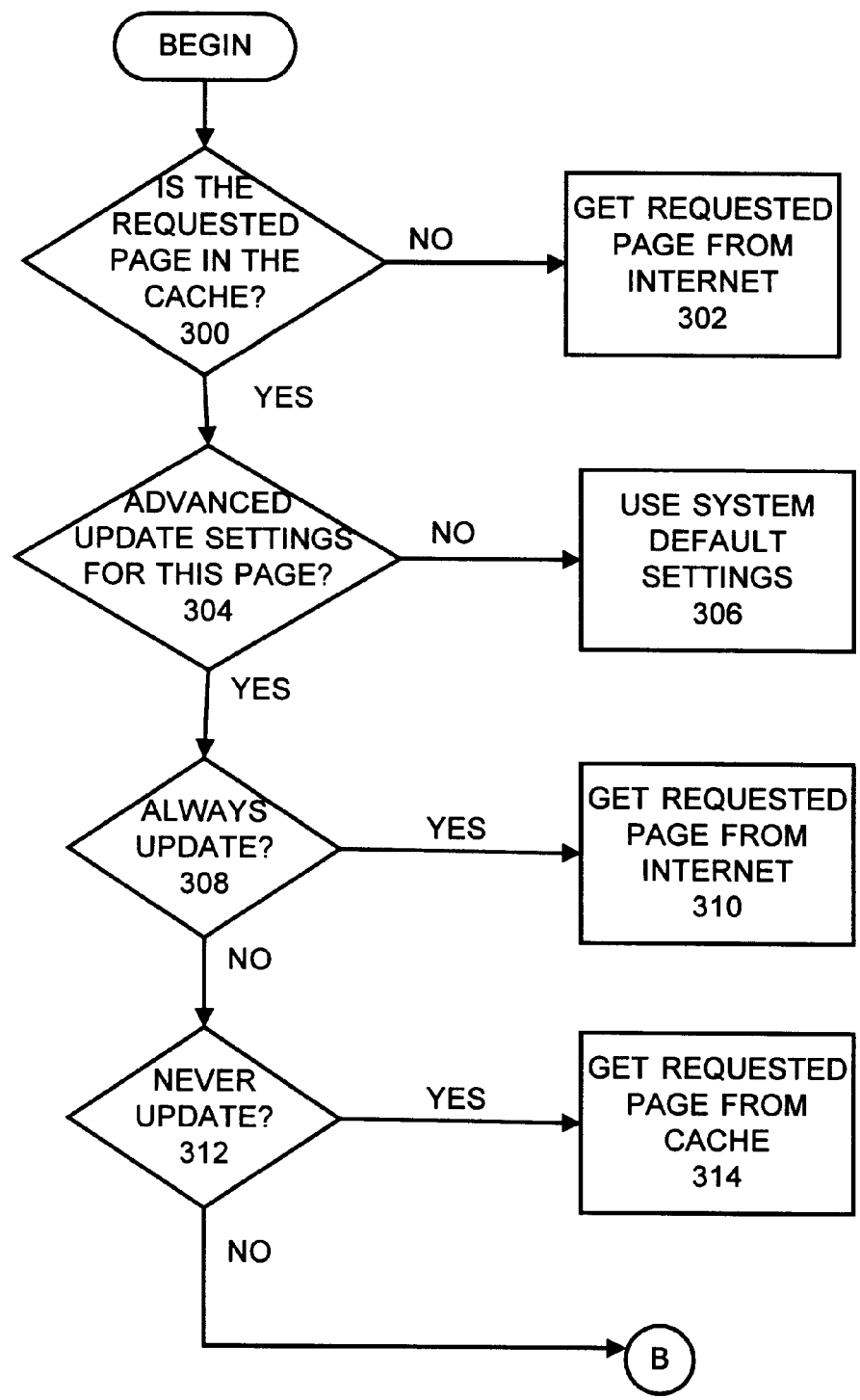
Figure 3B:
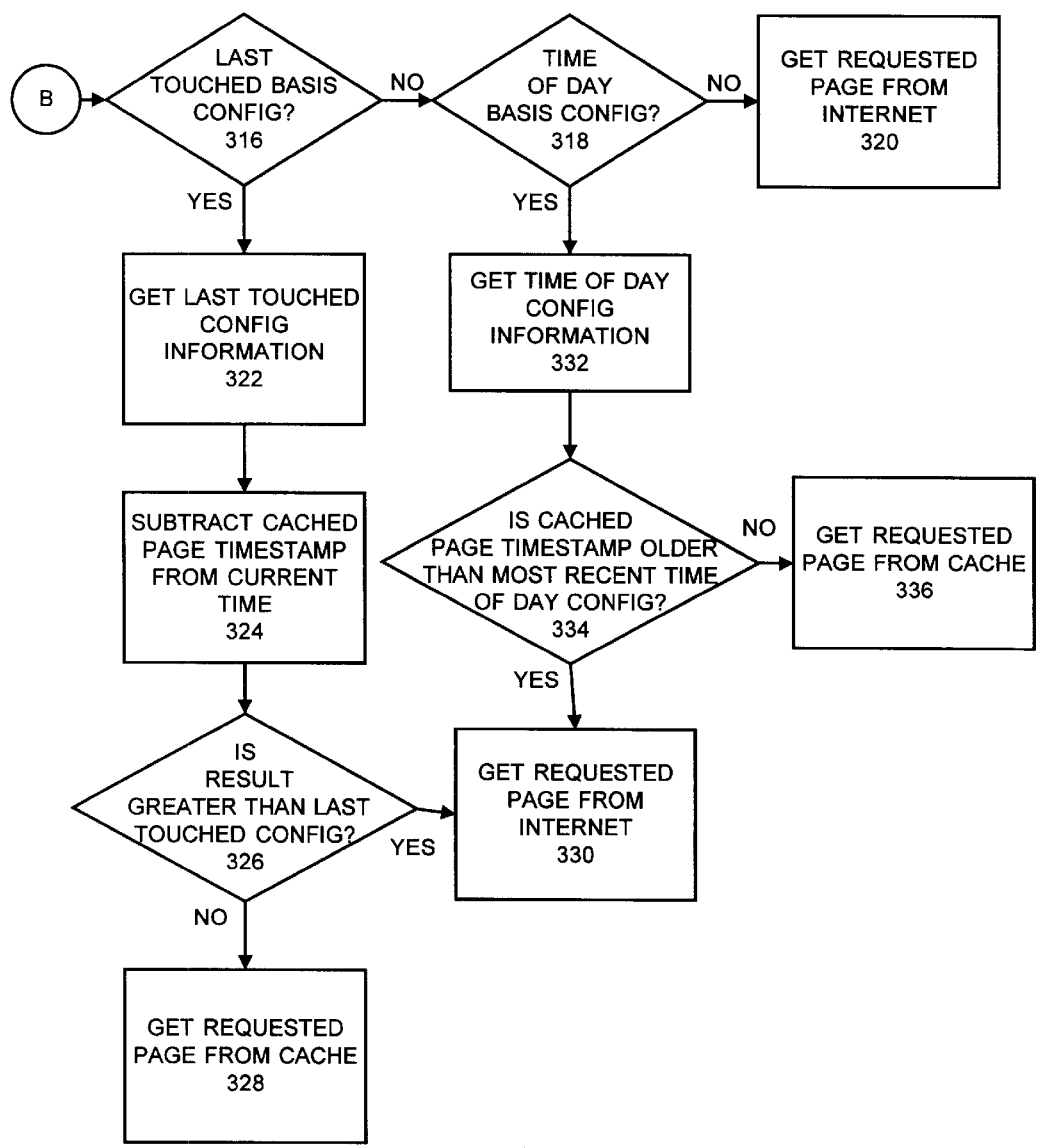

Referring to FIGS. 3A and 3B, there are shown exemplary sequential steps for user selected refreshing of internet web pages of the preferred embodiment. First it is determined whether a particular requested page is in cache or local memory within computer system 100 as indicated at a decision block 300. When determined that the requested page is not in cache, then the requested page is obtained from the internet as indicated at a block 302. Next a check is made for user selected advanced update settings for this page as indicated at a decision block 304. When user selected advanced update settings for this page are not identified, then the system or browser default settings are used as indicated at a block 306. When user selected advanced update settings for this page are identified, then a check for the always update optional setting is made as indicated at a decision block 308. When the user selected always update optional setting is identified, then the requested page is obtained from the internet as indicated at a block 310. When the user selected always update optional setting is not identified at decision block 308, then a check for the never update optional setting is made as indicated at a decision block 312. When the user selected never update optional setting is identified, then the requested page is obtained from cache as indicated at a block 314.

Referring now to FIG. 3B, when the user selected never update optional setting is not identified at decision block 312, then a check is made for a user selected last touched basis configuration as indicated at a decision block 316. When the user selected last touched basis configuration is not identified at decision block 316, then a check is made for a user selected time of day basis configuration as indicated at a decision block 318. When the user selected time of day basis configuration is not identified, then the requested page is obtained from the internet as indicated at a block 320.

When the user selected last touched basis configuration is identified at decision block 316, then the last touched configuration information is obtained as indicated at a block 322. Then the cached page timestamp is subtracted from the current time stamp as indicated at a block 324 and the result is compared with the last touched configuration information as indicated at a decision block 326. If the result is less than or equal to the last touched configuration information, then the requested page is obtained from cache as indicated at a block 328. If greater, then the requested page is obtained from the internet as indicated at a block 330. For example, assuming a user selected last touched configuration information of every 2 hours, with a current time of 13:42 and a cached page timestamp of 11:26, the result of 2:06 is greater than the last touched configuration information and the requested page is obtained from the internet at block 330.

When the user selected time of day basis configuration is identified at decision block 318, then the time of day configuration information is obtained as indicated at a block 332. Then the cached page timestamp is compared with the most recent time of day configuration value as indicated at a decision block 334. If the cached page timestamp is not older than the most recent time of day configuration value, then the requested page is obtained from cache as indicated at a block 336. If the cached page timestamp is older than the most recent time of day configuration value, then the requested page is obtained from the internet at block 330. For example, assuming a user selected time of day configuration information of 6:00, 8:00, 10:00, and 12:00, a current time of 11:12 and a cached page timestamp of 10:33; since the current time is 11:12, then the most recent time of day configuration is 10:00. The cached page timestamp is not older than the most recent time of day configuration so the requested page will be obtained from c ache at block 336.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the methods for user selected refreshing of internet web pages of the preferred embodiment in the system 100 of FIGS. 1A and 1B.

A sequence of program instructions or a logical assembly of one or more interrelated modules defined by the recorded program means 404, 406, 408, 410, direct the computer system 100 for implementing user selected refreshing of internet web pages of the preferred embodiment.

While the present invention has been described with reference to the details of the embodiments of the invention shown in the drawing, these details are not intended to limit the scope of the invention as claimed in the appended claims.

What is claimed is:

1. A method for user selected refreshing of internet web pages comprising the steps of:
   receiving a user selected refreshing optional setting;
   storing said user selected refreshing optional setting together with at least one selected internet web page;
   receiving a request for viewing an internet web page;
   responsive to said request, checking for said user selected refreshing optional setting for said requested internet web page;
   responsive to identifying said user selected refreshing optional setting for said requested internet web page, selectively refreshing said requested internet web page utilizing said user selected refreshing optional setting.

2. A method for user selected refreshing of internet web pages as recited in claim 1 wherein said step of storing said user selected refreshing optional setting together with at least one selected internet web page includes the step of identifying a user added favorite or bookmark of an internet web page and receiving said user selected refreshing optional setting for said user added favorite or bookmark of said internet web page.

3. A method for user selected refreshing of internet web pages as recited in claim 1 further includes the step of utilizing global browser default values responsive to said user selected refreshing optional setting not being identified for said requested internet web page.

4. A method for user selected refreshing of internet web pages as recited in claim 1 wherein said step responsive to identifying said user selected refreshing optional setting for said requested internet web page, of selectively refreshing said requested internet web page utilizing said user selected refreshing optional setting, includes the steps of identifying an always update user selected refreshing optional setting and obtaining said requested internet web page from the internet.

5. A method for user selected refreshing of internet web pages as recited in claim 1 wherein said step responsive to identifying said user selected refreshing optional setting for said requested internet web page, of selectively refreshing said requested internet web page utilizing said user selected refreshing optional setting, includes the steps of identifying a never update user selected refreshing optional setting and obtaining said requested internet web page from cache memory.

6. A method for user selected refreshing of internet web pages as recited in claim 1 wherein said step responsive to identifying said user selected refreshing optional setting for said requested internet web page, of selectively refreshing said requested internet web page utilizing said user selected refreshing optional setting, includes the steps of identifying a last touched user selected refreshing optional setting, subtracting a cached page timestamp for said requested page from a current time value to provide a result, comparing said result with said last touched user selected refreshing optional setting, and responsive to said result greater than said last touched user selected refreshing optional setting, obtaining said requested internet web page from the internet.

7. A method for user selected refreshing of internet web pages as recited in claim 6 responsive to said result less than or equal to said last touched user selected refreshing optional setting, obtaining said requested internet web page from cache memory.

8. A method for user selected refreshing of internet web pages as recited in claim 1 wherein said step responsive to identifying said user selected refreshing optional setting for said requested internet web page, of selectively refreshing said requested internet web page utilizing said user selected refreshing optional setting, includes the steps of identifying a user selected time of day refreshing optional setting, utilizing a current time value for identifying a most recent user selected time of day value from said user selected time of day refreshing optional setting, comparing a cached page timestamp for said requested page with said identified most recent user selected time of day value, and responsive to said cached page timestamp older than said most recent current time of day value, obtaining said requested internet web page from the internet.

9. A method for user selected refreshing of internet web pages as recited in claim 8 includes the step responsive to said cached page timestamp not being older than said most recent current time of day value, obtaining said requested internet web page from cache memory.

10. A computer program product for use in a computer system comprising:

a recording medium;

means, recorded on the recording medium, for storing a user selected refreshing optional setting together with at least one selected internet web page;

means, recorded on the recording medium, for receiving a request for viewing an internet web page;

means, recorded on the recording medium, responsive to said received request for checking for said user selected refreshing optional setting for said requested internet web page;

means, recorded on the recording medium, responsive to identifying said user selected refreshing optional setting for said requested internet web page, for selectively refreshing said requested internet web page utilizing said user selected refreshing optional setting.

11. A computer program product as recited in claim 10 include a refresh manager program and a browser program and wherein said means, recorded on the recording medium, for storing said user selected refreshing optional setting together with at least one selected internet web page include means, recorded on the recording medium, for identifying a user added favorite or bookmark of an internet web page and for receiving said user selected refreshing optional setting for said user added favorite or bookmark.

12. A computer program product as recited in claim 11 wherein said means, recorded on the recording medium, responsive to identifying said user selected refreshing optional setting for said requested internet web page, for selectively refreshing said requested internet web page utilizing said user selected refreshing optional setting include means, recorded on the recording medium, for identifying said user selected refreshing optional setting of one of an always update user selected refreshing optional setting, a never update user selected refreshing optional setting, a last touched user selected refreshing optional setting, and a user selected time of day refreshing optional setting.

13. A computer program product as recited in claim 12 include means, recorded on the recording medium, for identifying a cached timestamp value for said requested internet web page.

14. Apparatus for user selected refreshing of internet web pages comprising:

means for storing a user selected refreshing optional setting together with at least one user selected favorite or bookmark internet web page;

means for receiving a request for viewing an internet web page;

means responsive to said received request for checking for said user selected refreshing optional setting for said requested internet web page;

means responsive to identifying said user selected refreshing optional setting for said requested internet web page, for selectively refreshing said requested internet web page utilizing said user selected refreshing optional setting.

15. Apparatus for user selected refreshing of internet web pages as recited in claim 14 wherein said means responsive to identifying said user selected refreshing optional setting for said requested internet web page, for selectively refreshing said requested internet web page utilizing said user selected refreshing optional setting include means for identifying an always update user selected refreshing optional setting and for obtaining said requested internet web page from the internet.

16. Apparatus for user selected refreshing of internet web pages as recited in claim 14 wherein said means responsive to identifying said user selected refreshing optional setting for said requested internet web page, for selectively refreshing said requested internet web page utilizing said user selected refreshing optional setting include means for identifying a last touched user selected refreshing optional setting; means for comparing a cached page timestamp for said requested page with a current time value; and means, responsive to said comparing means, for obtaining said requested internet web page from the internet.

17. Apparatus for user selected refreshing of internet web pages as recited in claim 14 wherein said means responsive to identifying said user selected refreshing optional setting for said requested internet web page, for selectively refreshing said requested internet web page utilizing said user selected refreshing optional setting include means for identifying a user selected time of day refreshing optional setting; means, utilizing a current time value, for identifying a most recent user selected time of day value from said user selected time of day refreshing optional setting; means for comparing a cached page timestamp for said requested page with said identified most recent user selected time of day value; and means responsive to said cached page timestamp older than said most recent current time of day value, for obtaining said requested internet web page from the internet.

18. Apparatus for user selected refreshing of internet web pages as recited in claim 14 wherein said means responsive to identifying said user selected refreshing optional setting for said requested internet web page, for selectively refreshing said requested internet web page utilizing said user selected refreshing optional setting include means for identifying a never update user selected refreshing optional setting and for obtaining said requested internet web page from cache memory.

* * * * *